(12) United States Patent
Jungbecker et al.

(10) Patent No.: US 8,136,622 B2
(45) Date of Patent: Mar. 20, 2012

(54) SUPERIMPOSED STEERING SYSTEM

(75) Inventors: Johann Jungbecker, Badenheim (DE); Steffen Linkenbach, Eschborn (DE); Joachim Nell, Hanau (DE); Norman Muth, Frankenberg (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 1213 days.

(21) Appl. No.: 10/557,867

(22) PCT Filed: May 19, 2004

(86) PCT No.: PCT/EP2004/050863
§ 371 (c)(1),
(2), (4) Date: Nov. 29, 2007

(87) PCT Pub. No.: WO2004/103799
PCT Pub. Date: Dec. 2, 2004

(65) Prior Publication Data
US 2008/0116002 A1 May 22, 2008

(30) Foreign Application Priority Data
May 23, 2003 (DE) .................................. 103 23 847

(51) Int. Cl.
*B62D 5/04* (2006.01)

(52) U.S. Cl. ......................... 180/444; 180/443; 180/446

(58) Field of Classification Search .................. 180/443, 180/444, 446
See application file for complete search history.

(56) References Cited

U.S. PATENT DOCUMENTS

| | | | |
|---|---|---|---|
| 4,751,976 A | 6/1988 | Higuchi et al. | |
| 5,230,397 A * | 7/1993 | Tranchon | 180/444 |
| 5,236,335 A * | 8/1993 | Takeuchi et al. | 180/446 |
| 5,333,700 A * | 8/1994 | Mouri | 180/444 |
| 5,381,869 A * | 1/1995 | Norton | 180/446 |
| 5,503,241 A * | 4/1996 | Hiraiwa | 180/446 |
| 6,138,787 A * | 10/2000 | Miotto | 180/405 |
| 6,164,150 A | 12/2000 | Shindo et al. | |
| 6,179,083 B1 | 1/2001 | Yamauchi | |
| 6,382,344 B1 | 5/2002 | Lohner et al. | |
| 6,520,274 B1 | 2/2003 | McElmeel, Jr. et al. | |
| 6,705,424 B2 * | 3/2004 | Ogawa et al. | 180/446 |
| 7,337,872 B2 * | 3/2008 | Bohm et al. | 180/446 |
| 2002/0189888 A1 * | 12/2002 | Magnus et al. | 180/402 |
| 2003/0070867 A1 | 4/2003 | Magnus | |
| 2003/0196849 A1 * | 10/2003 | Menjak et al. | 180/446 |
| 2004/0104067 A1 * | 6/2004 | Fishbach et al. | 180/444 |

FOREIGN PATENT DOCUMENTS

| | | |
|---|---|---|
| DE | 3121008 | 12/1982 |
| DE | 10023584 | 11/2001 |
| DE | 10160313 | 3/2003 |
| WO | 03055732 | 7/2003 |

* cited by examiner

Primary Examiner — Joanne Silbermann
Assistant Examiner — Maurice Williams

(57) ABSTRACT

Disclosed is a superimposition steering unit in which a steering angle set by the driver can have an additional angle superimposed thereon. The superimposition is caused by individually operable structural components.

15 Claims, 11 Drawing Sheets

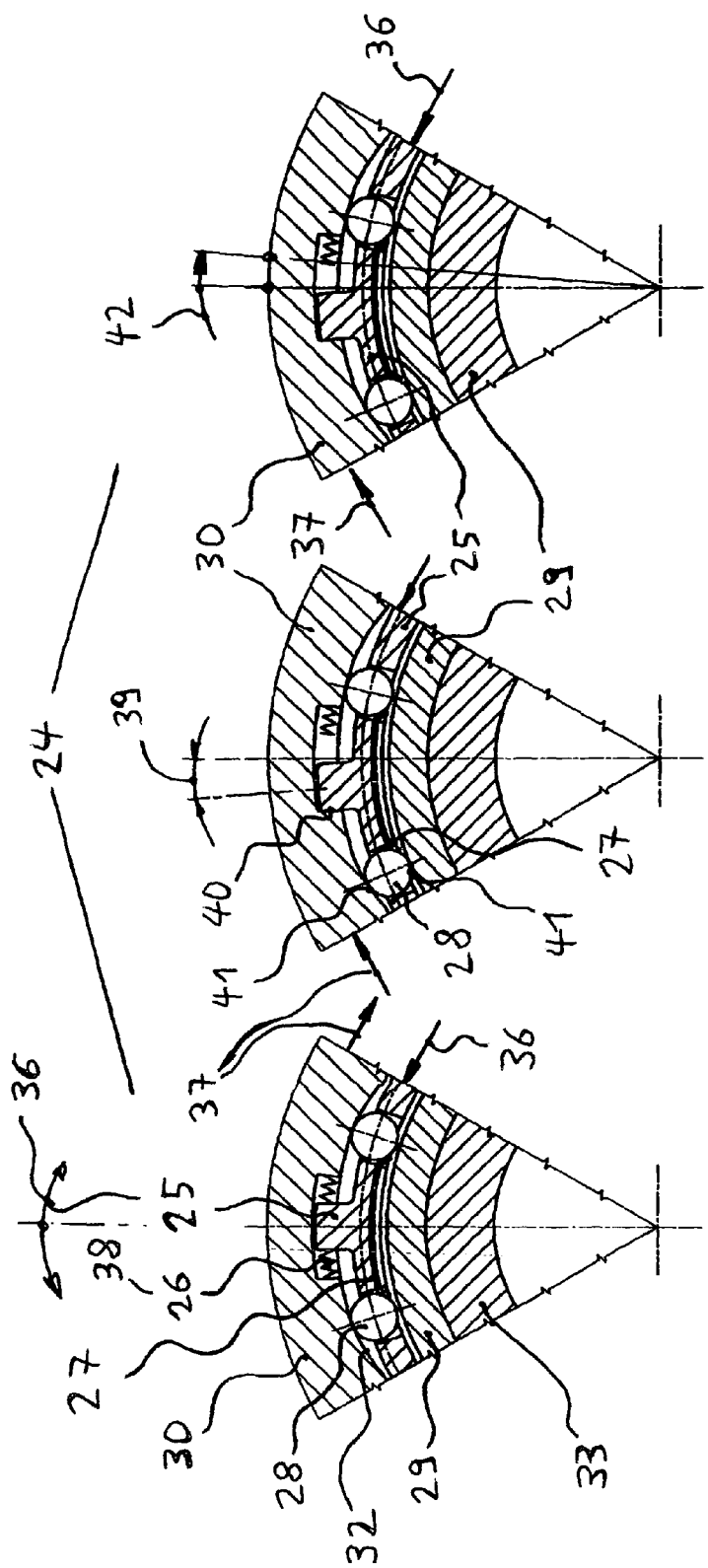

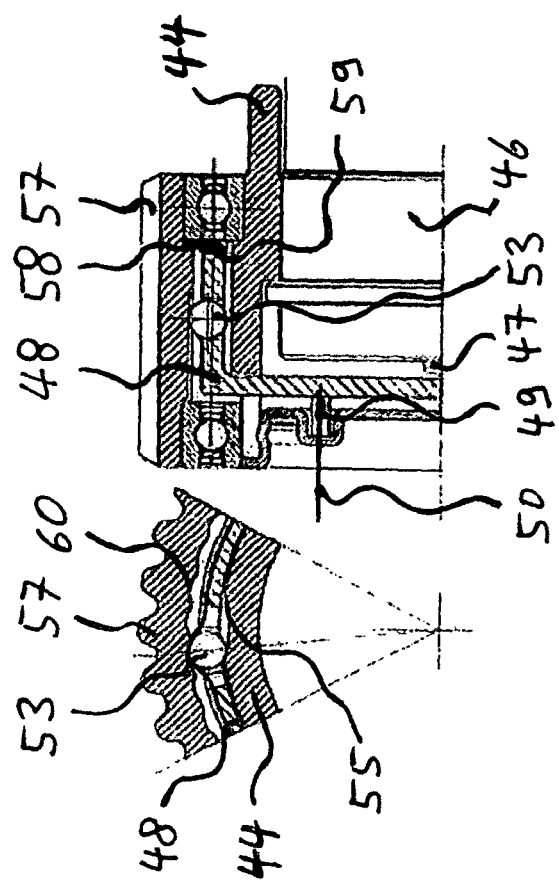
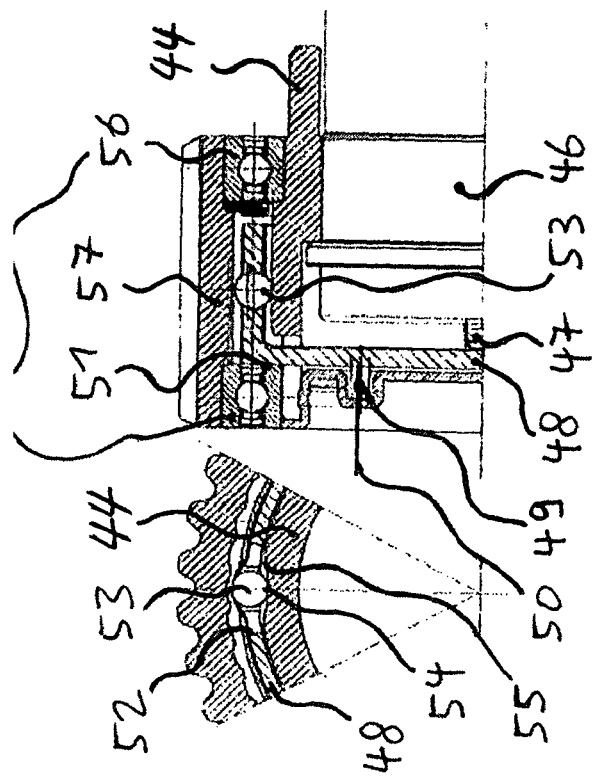

SUPERIMPOSED STEERING SYSTEM

This application is the U.S. national phase of international application PCT/EP04/50863 filed May 19, 2004, which designated the U.S. and which claims the benefit of priority of German Patent Application Number 10 323 847.6 filed May 23, 2003. The contents of each of the aforementioned documents are incorporated herein in their entirety.

BACKGROUND OF THE INVENTION

The invention relates to a superimposition steering unit, in which a superimposition angle set by the driver can, upon need, be superimposed by an additional angle.

The current motor vehicles, especially passenger vehicles, are, as a general rule, equipped with hydraulic or electro-hydraulic power-assisted steering units in which a steering wheel is mechanically connected with the steerable vehicle wheels in a force-locked manner. The servo-support unit is constructed in such a manner that actuators, such as hydraulic cylinders, for example, are positioned in the central area of the steering mechanism. The activation of the steering mechanism is supported, in reaction to the turning of the steering wheel, by a force produced by the actuators. The expenditure of energy by the driver during the steering process is thereby reduced.

Superimposition steering systems are already known. They are characterized in that the steering angle set by the driver can, upon need, be superimposed by an additional angle by means of an actuator. The additional angle is controlled by an electronic control unit and serves to increase the stability and agility of the vehicle, for example. Hydraulic or electrical actuators are used.

SUMMARY OF THE INVENTION

The task of the invention is to create a superimposition steering system by means of which the steering angle set by the driver can be securely and reliably superimposed by an additional angle. The drive for the superimposition steering system should thereby be easily integrated into the steering system and only require a small construction space.

The task is solved by means of the characteristics of a superimposition steering unit that can impose an angle additional to that selected by a driver.

In accordance with the invention, it is provided that the superimposition function of the superimposition steering system is provided by means of individually controllable structural components or modules, as the case may be.

In principle, an application for power-assisted steering units, in which supplemental steering forces are exerted on the steering rod or on the steering shaft, is thereby possible.

In accordance with the invention, it is provided that a drive function is implemented in the superimposition gear by means of one or more drive function module (s), and a safety function is implemented by one or more safety function module (s) separate from the drive function module.

In accordance with the invention, it is provided that the superimposition steering system has a superimposition gear, which has at least one secondary gear module and one primary gear module as two individually operable structural components.

In accordance with the invention, it is provided that the secondary gear module has a drive motor, a frontal drive or belt drive, preferably a belt drive, and a primary gear drive unit.

In accordance with the invention, it is provided that the primary gear drive unit has a momentum-controlled freewheel unit acting on both sides, which drive unit has means so that, within a nominal range of the steering momentum, preferably within a steering momentum range from approx. 5 to 10 Nm, a required superimposition angle is conveyed to a steering gear of the superimposition steering system by means of the secondary gear and the primary gear, and if, in the event of an overload, the steering momentum leaves the nominal range—that is to say, if the steering momentum applied is greater than a steering momentum of approx. 5 to 10 Nm—, then a backwards rotation of the primary gear drive unit is thereby prevented.

In accordance with the invention, it is provided that the primary gear drive unit has a drive wheel, a free-running spring, a clamping body spring, a clamping body, a clamping- and support ring, a coupling of the primary gear, a secondary gear support, and clamping inclines.

In accordance with the invention, it is provided that the primary gear module has a planetary gear unit and a locking unit.

In accordance with the invention, it is provided that an individually operable structural component, which has means for locking the superimposition gear system in the event of an error, is provided in the primary gear or in the primary gear housing, as the case may be.

In accordance with the invention, it is provided that the superimposition steering system has a planetary gear as a superimposition gear and that the locking unit can be activated electrically and locks the pinion cage casing upon the appearance of an error, such as a power outage or a plausibility error, by means of a form-locking connection, preferably a frontal dovetailing.

In accordance with the invention, it is provided that the superimposition steering system is integrated into a hydraulic or electro-hydraulic power-assisted steering system by means of mounting in a divided steering column. In other words, the means for the superimposition function of the superimposition steering are integrated into a "conventional" hydraulic or electro-hydraulic power-assisted steering system as a "superimposition function module" in the steering column.

BRIEF DESCRIPTION OF THE DRAWINGS

The invention will be explained in further detail by means of one example of implementation and by means of diagrams (FIG. 1 to FIG. 18) which are provided by way of example.

FIG. 11 depicts a cut-out section of the secondary gear structural component of the superimposition gear in a condition in a nominal load range of the gear, in that of the superimposition actuator (electrical motor).

FIG. 12 depicts a cut-out section of the secondary gear structural component of the superimposition gear in a condition of a boundary range of the nominal load range.

FIG. 13 depicts a cut-out section of the secondary gear structural component of the superimposition gear in a condition in an overload range, in which the superimposition actuator (electrical motor) produces excessive forces or momentums.

FIG. 15 depicts a first cut-out section of the locking unit in the "open" condition.

FIG. 16 depicts a second cut-out section of the locking unit in the "open" condition.

FIG. 17 depicts the first cut-out section of the locking unit in the "closed" condition.

FIG. 18 depicts the second cut-out section of the locking unit in the "closed" condition.

DETAILED DESCRIPTION OF THE DRAWINGS

Figure 14:
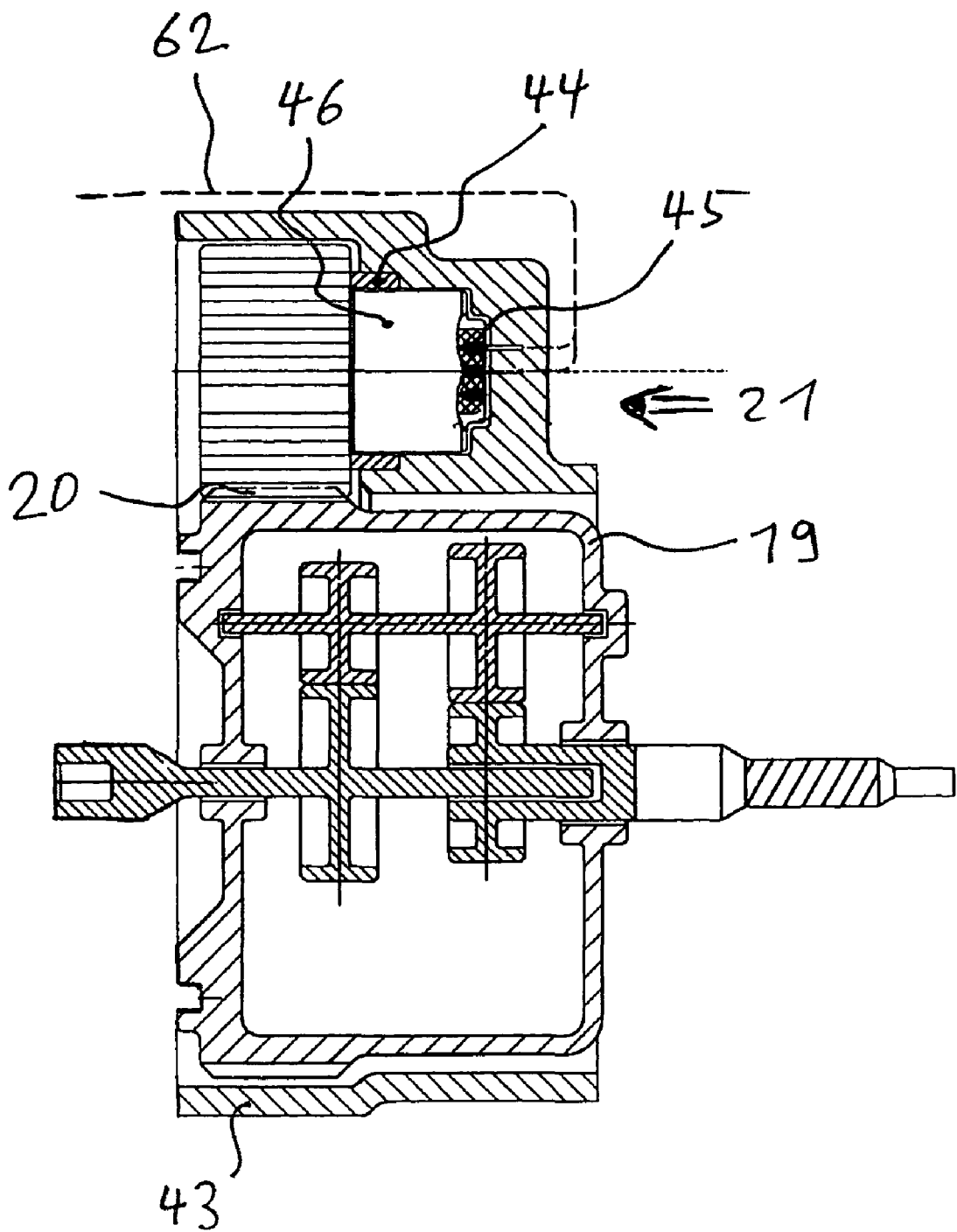
FIG. 14 depicts the locking unit in an enlarged representation.

Item (21) is preferably a pre-assembled and pre-inspected, as well as individually operable, structural component, and is axially mounted in the primary gear casing (43) in an interlocking and force-locking manner by means of the internal ring (44). During the mounting of the locking unit (21), a contacting (45) of an integrated activating magnet (46) with the internal or external strip conductor (dotted line 62 in FIG. 14) can be carried out at the same time.

Figure 1:
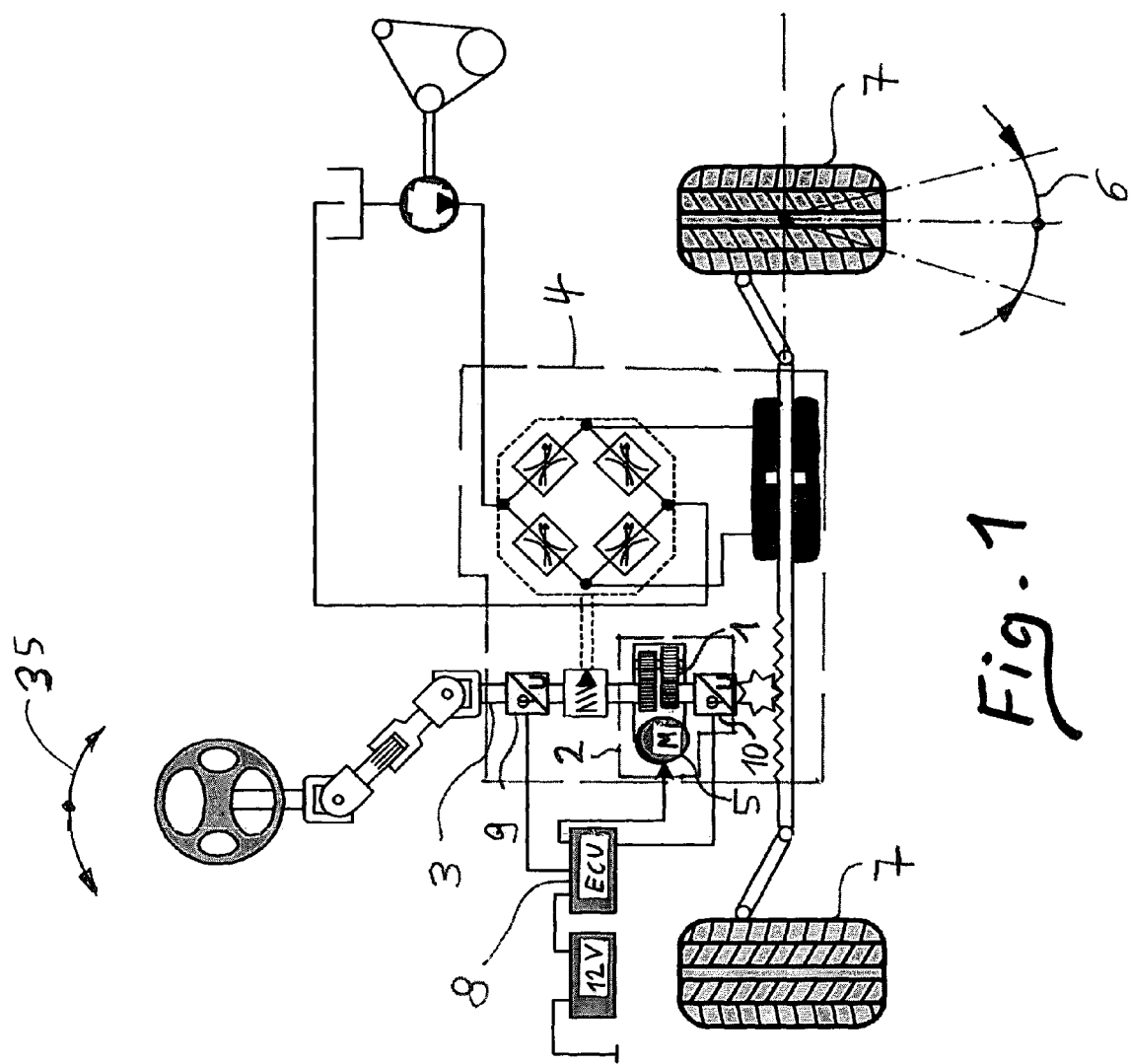
FIG. 1 depicts a superimposition steering system in accordance with the invention which is based upon a conventional hydraulic power-assisted steering unit.

FIG. 1 depicts an example of application of the superimposition steering system (ESAS/"Electric Steer Assisted Steering") in accordance with the invention in a schematic overview.

A superimposition gear (1) of a superimposition steering system (2) is hereby integrated into the divided steering column (3) of a conventional power-assisted steering unit (4). Through the intervention of an electrical motor (5) that is provided, an additional or reduced steering angle (6) can be produced on the front wheels (7) by the superimposition gear (1) (variable steering angle). The variable steering angle is set by a control unit (8) that controls the electrical motor (5). Signals from rotational angle sensors (9, 10), by means of which the rotational angle of the steering column (3) is determined in front of and behind the superimposition gear (1), are supplied to the control unit (8). By means of the superimposition (6), the driving behavior and the vehicle dynamics can be positively influenced in a manner corresponding to the known driving situation. In particular, dynamic vehicle steering interventions can be carried out in order to support the driver in his steering activity. The superimposition steering unit (2) is thereby integrated into the conventional power-assisted steering unit (4) as a module.

Figure 2:
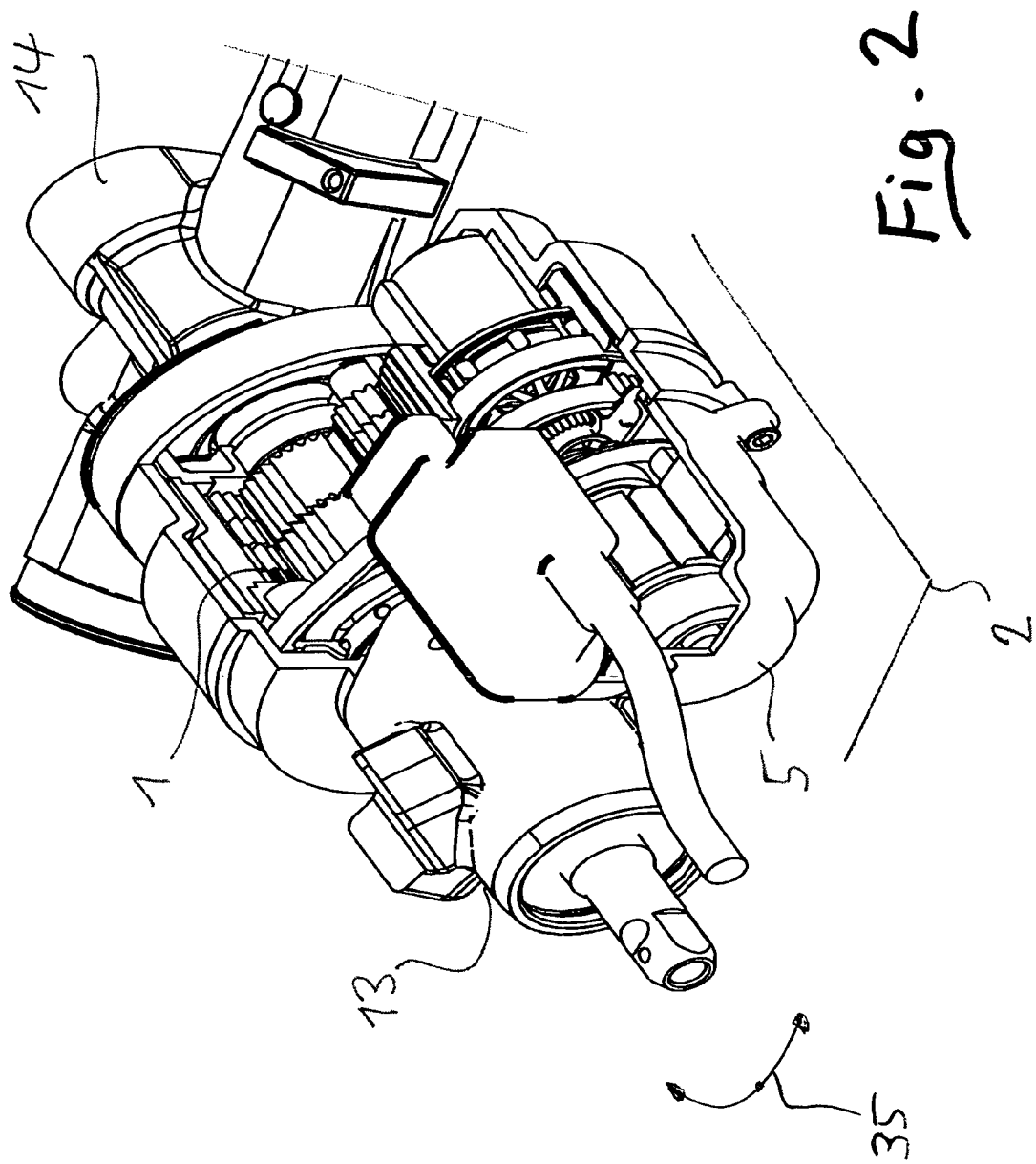
FIG. 2 depicts essential elements of the superimposition steering system, in a perspective view.

Essential elements of the superimposition steering (2) are depicted in FIG. 2 in a perspective view.

In accordance with the invention, the superimposition steering unit (2) contains the actual superimposition gear (1) with the electrical motor (5) as a modularly constructed primary structural component. Furthermore, essentially two additional modularly constructed primary structural components are coordinated with the superimposition steering unit (2): one essentially conventional steering valve (13), and one essentially conventional steering gear (14).

Figure 3:
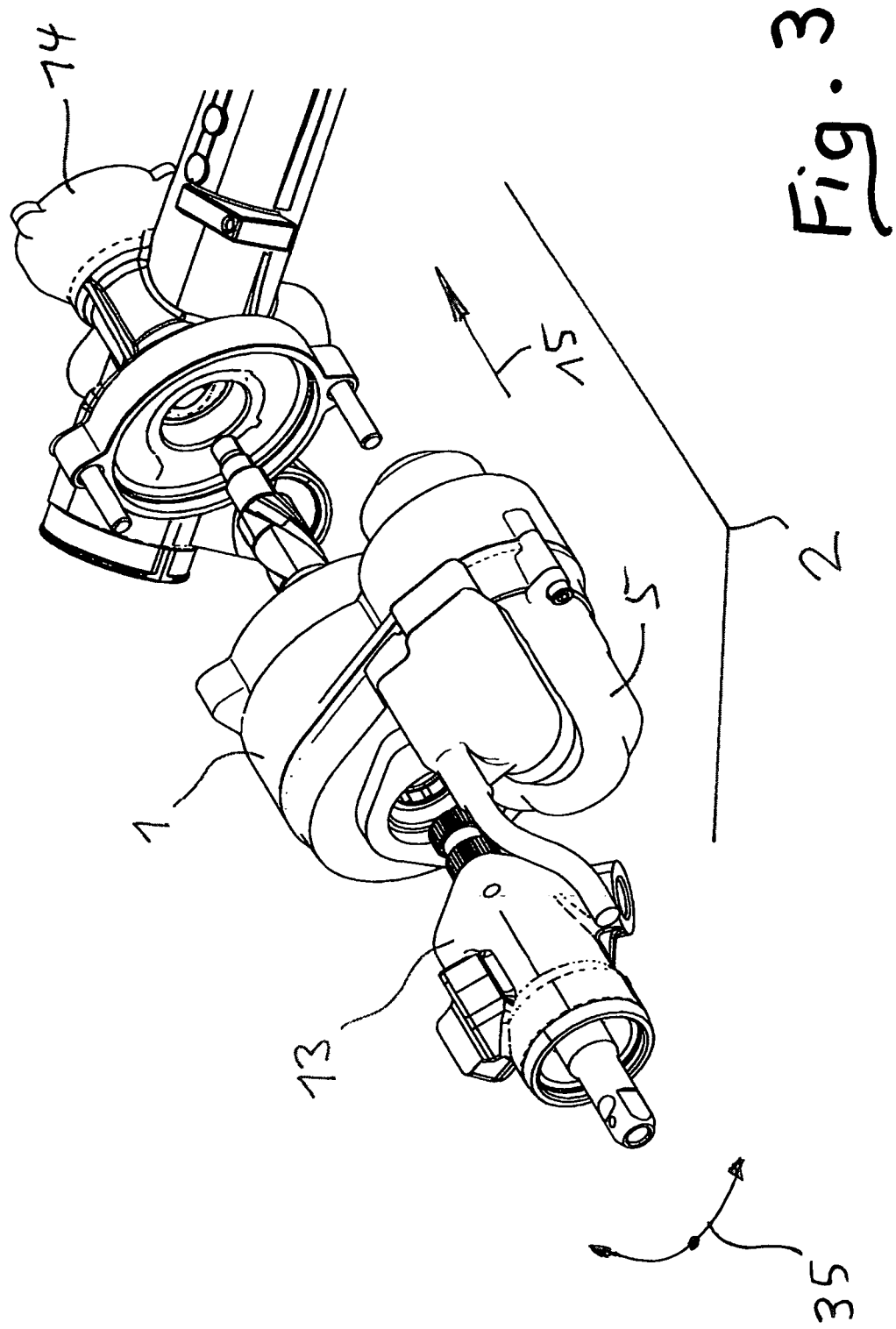
FIG. 3 depicts the individual elements of the superimposition steering system separated from one another in space.

FIG. 3 depicts the superimposition steering unit (2) depicted in FIG. 2 in a view in which the individual elements or primary structural components are spatially separated from one another.

Figure 4:
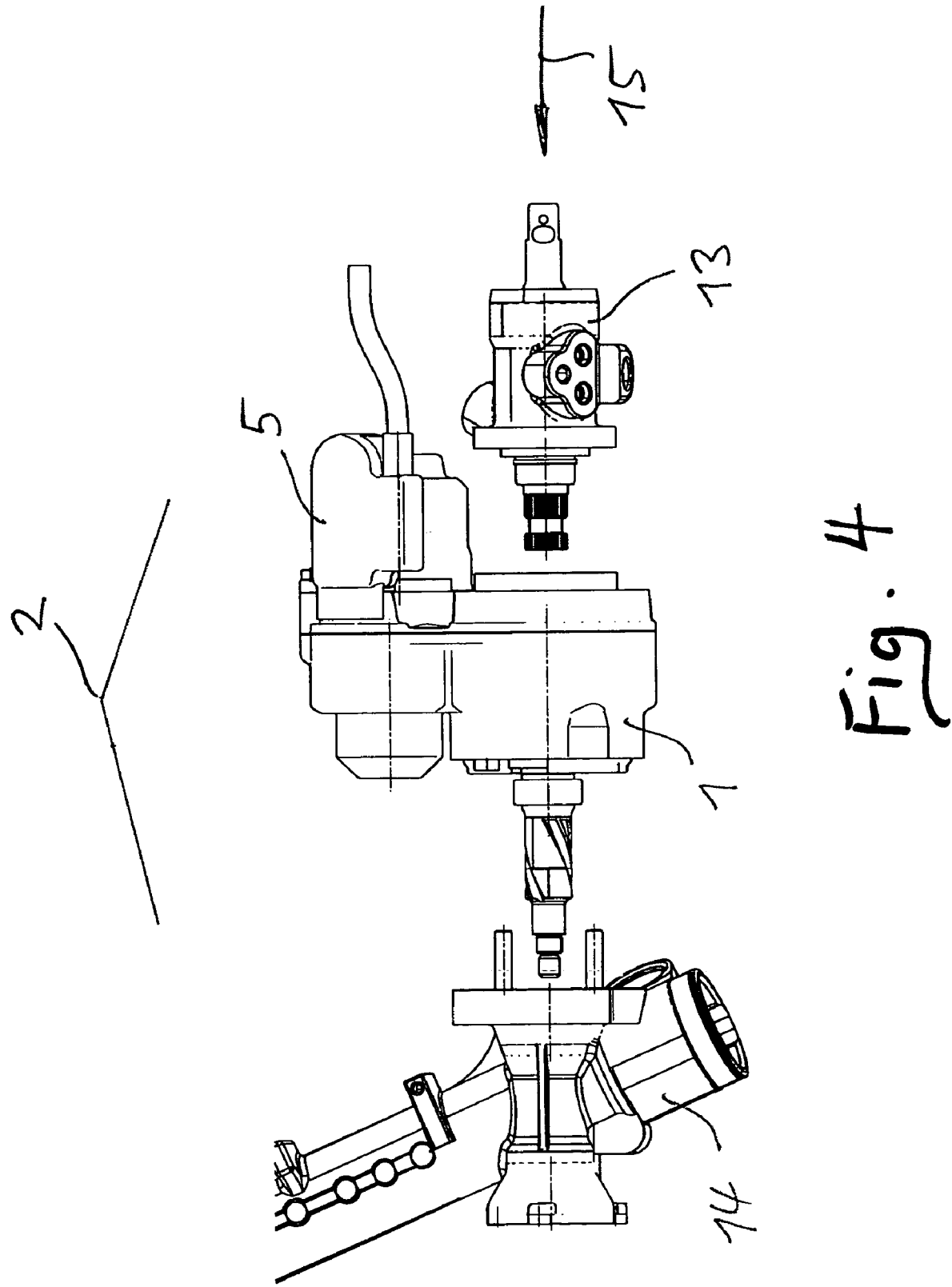
FIG. 4 depicts the elements depicted in FIG. 3 in a perspective view.

The elements of the superimposition steering unit (2) depicted in FIG. 3 are depicted in FIG. 4 in a perspective view.

Figure 5:
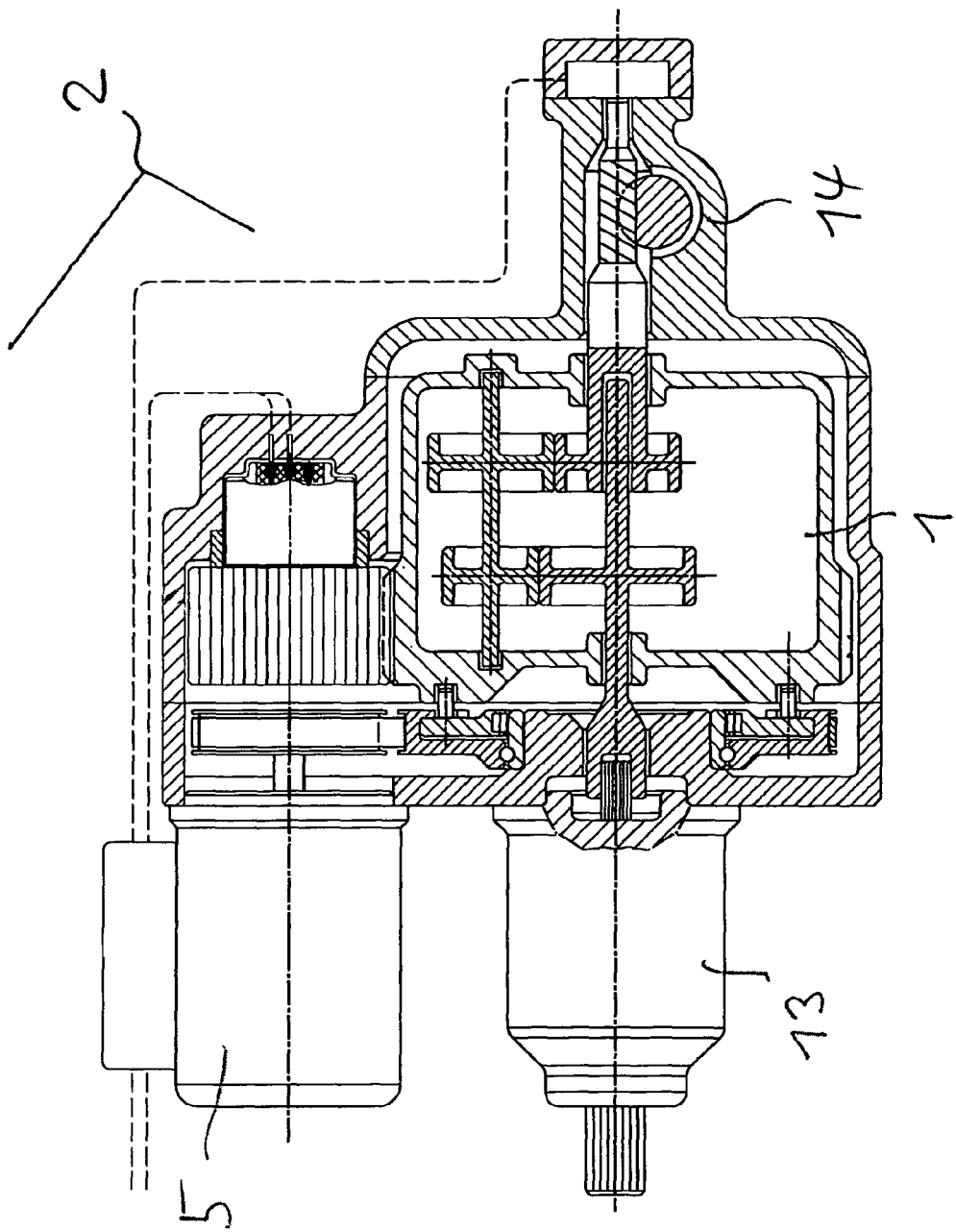
FIG. 5 depicts the essential elements of the superimposition steering system in a cross-section.
Figure 6:
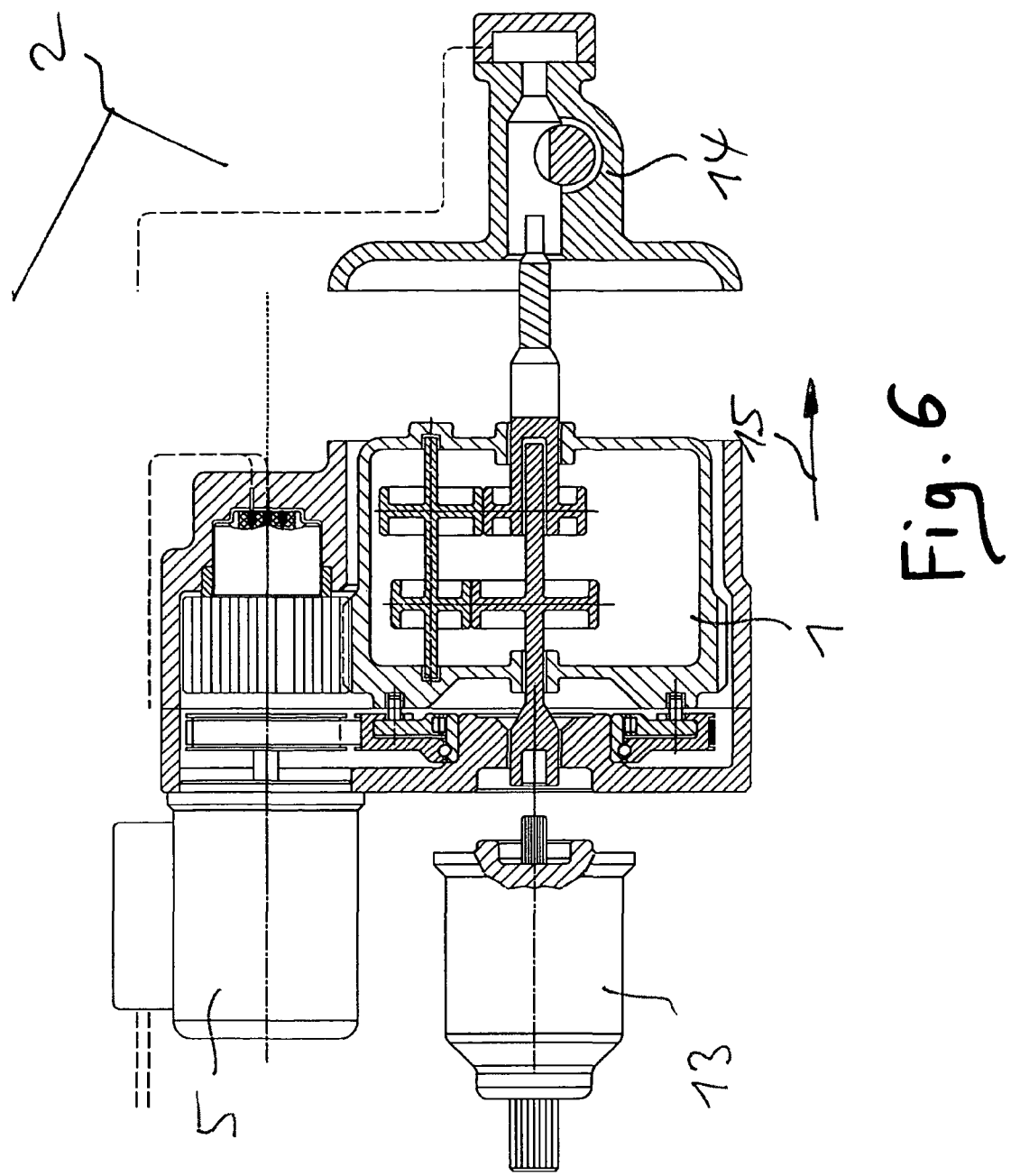
FIG. 6 depicts the individual elements of the superimposition steering system separated from one another in space in a cross-sectional view.

The essential elements of the superimposition steering unit are depicted in FIG. 5 in a cross-section, and these individual elements of the superimposition steering unit are depicted, spatially separated from one another and in a cross-section, in FIG. 6.

Through the construction form of the individual elements (1, along with 5, 13, 14) as individually operable structural components or modules, as the case may be, the structural components can be individually examined in their base function and can be mounted axially (see arrow 15) to the overall system of the superimposition steering unit (2).

This makes advantages possible in a serial production of the steering system: because a final mounting of structural components previously inspected is possible through the modular construction. In addition, the central unit of the superimposition gear (1) can easily be integrated into existing hydraulic steering systems (4) because of this modularly selected construction.

The constructional set-up and the drive- and safety concept of the integrated superimposition gear (1) will be described in the following in accordance with the invention.

It is thereby provided in accordance with the invention that a separation of the drive concept and the safety concept is brought about. A high systems dynamic can thereby be achieved, which is particularly useful for an improved driving dynamics regulating system, such as ESP II.

Figure 7:
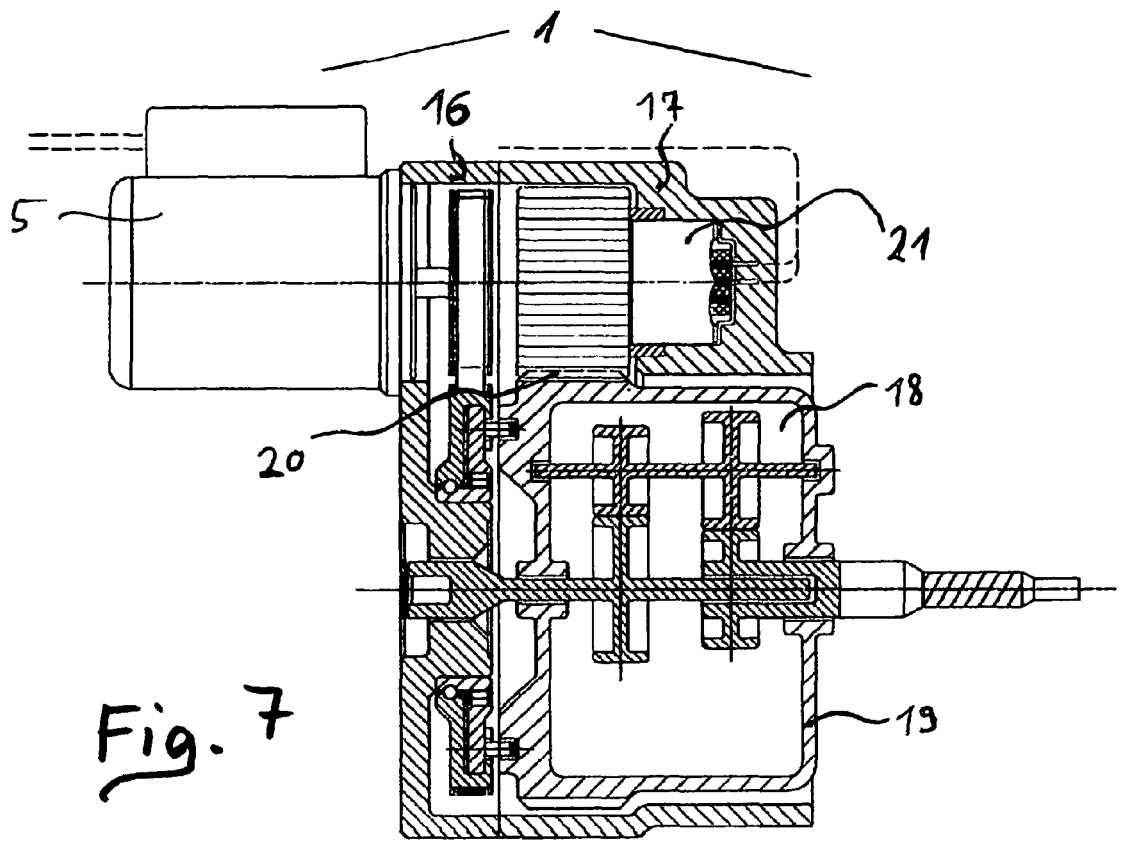
FIG. 7 depicts two modular structural components of the superimposition gear.
Figure 8:
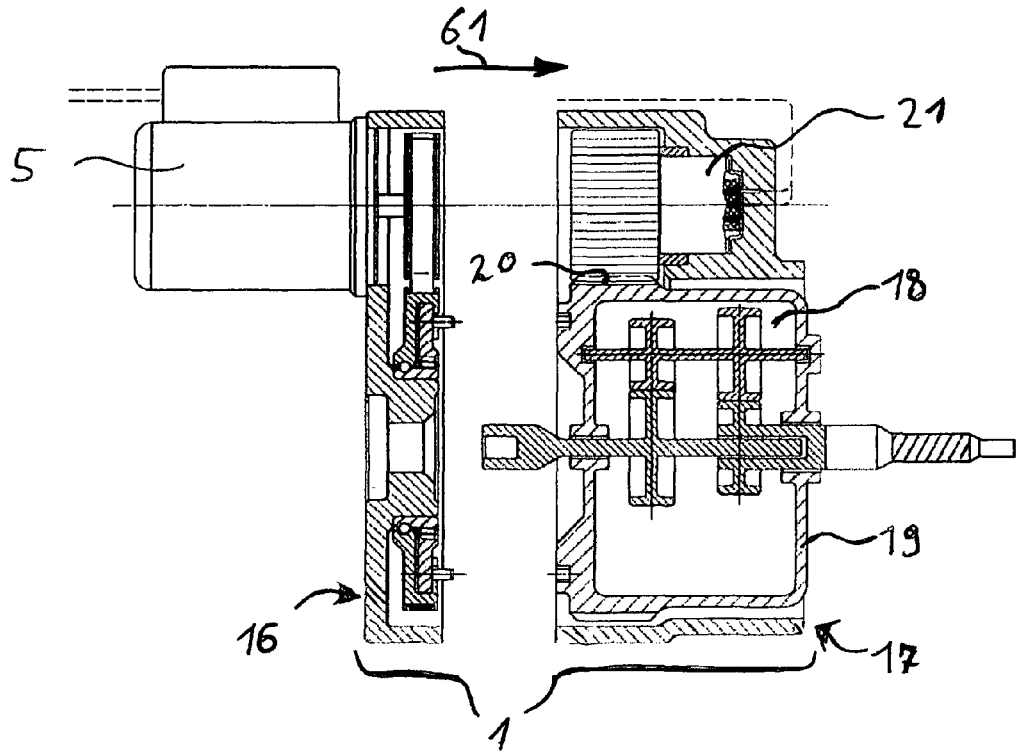
FIG. 8 depicts the two modular structural components of the superimposition gear as individual elements separated from one another in space.

The construction and the function of the entire superimposition gear system will first be described in further detail (see FIG. 7 and FIG. 8).

The structural group of the superimposition gear (1) itself has two modular structural groups: a secondary gear (16) and a primary gear (17). This makes possible a simple axial mounting (see arrow 61) of the superimposition gear (1).

The primary gear (17) has an integrated locking unit (21). Upon the appearance of an error, the locking of the superimposition gear (1) takes place by means of this rotating, electrically-activated locking unit (21), which is connected in a form-locking manner. It can also be constructed as individually operable structural groups. The form-locking connection is carried out here by means of a frontally dovetailed toothing (20). The locking is carried out by means of a blocking, and thereby a secure locking of the pinion cage casing (19). The electrically-activated locking unit (21) is preferably open in the powered condition.

Figures 9, 10:
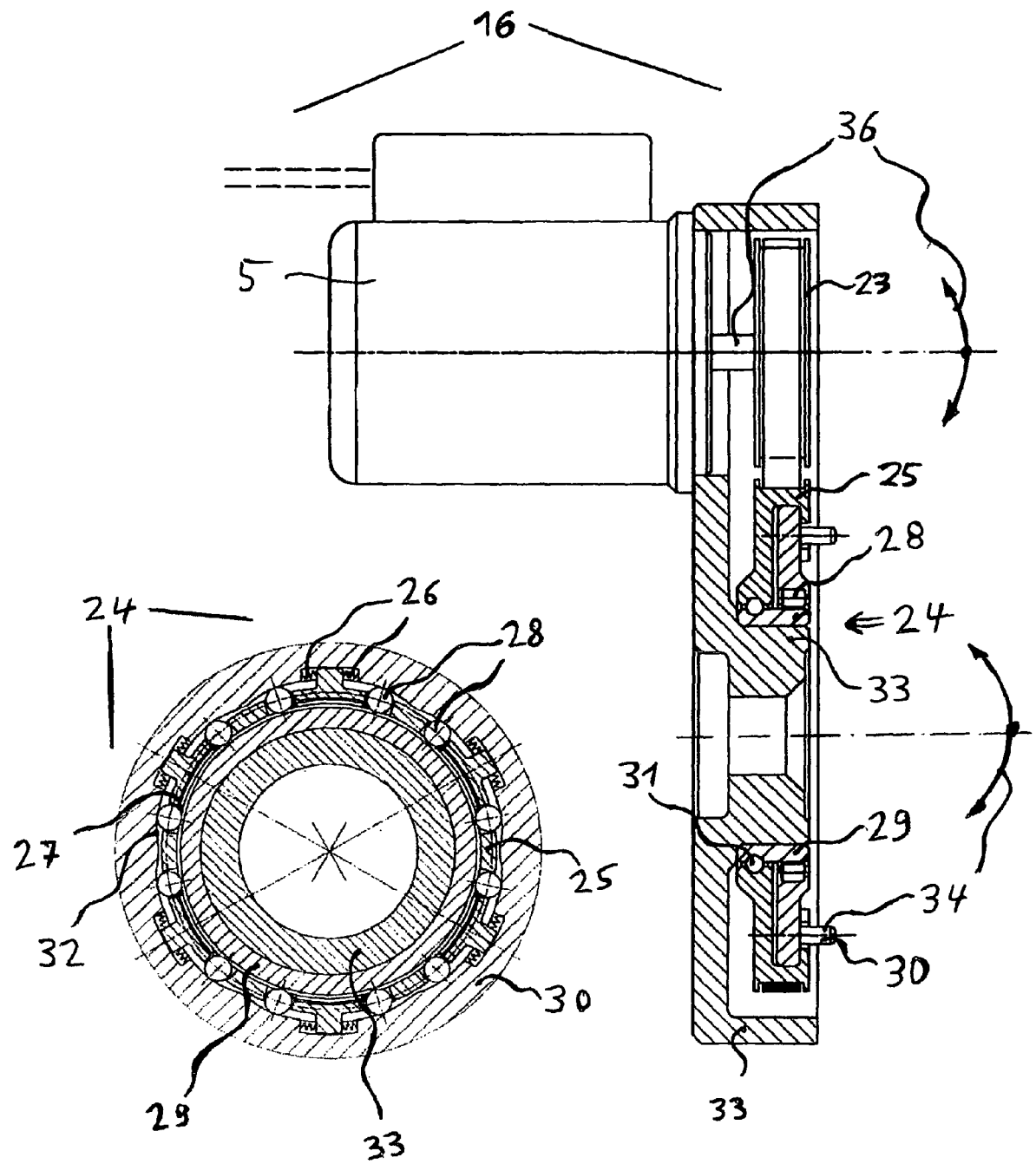
FIG. 9 depicts a cut-out section of a secondary gear structural component of the superimposition gear.
FIG. 10 depicts individual elements of the secondary gear separated from one another in space, in a cross-section.

The secondary gear (16) is depicted in further detail in FIG. 9 and FIG. 10. Its function as a self-inhibiting gear, also termed "diode function" in the following, is depicted by means of FIG. 11 to FIG. 13.

The secondary gear (16) essentially consists of a drive motor, the electrical motor (5), a frontal- or belt drive wheel (23), a secondary gear housing (33), and a primary gear drive unit (24).

The primary gear drive unit (24) essentially consists of a main drive wheel (25), a free-running spring (26), a clamping body spring (27), a clamping body (28), a clamping- and support ring (29), a coupling of the primary gear (30), a secondary gear support (31), and of clamping inclines (32).

The secondary gear (16) is a preassembled, inspectable unit and, after the mounting of the primary gear unit (17), conveys the starting torque (34) onto the planet wheel drive (18) by way of the coupling of the primary gear (30).

The function of the primary gear drive unit (24) will be described in the following.

Within a nominal range of the steering momentum (35, see FIG. 1 to FIG. 3), preferably in a steering momentum range of approx. 5 to 10 Nm, the motor starting torque (36) of the drive motor (5) is dimensioned in such a manner that the superimposition angle required is, in static and dynamic terms, transmitted by means of the secondary gear (16) and the primary gear (17) onto the steering valve (13) and, finally, onto the steering gear (14). This means that the feedback momentum (37) is less than (<) the starting torque of the motor (36) (Case 1, see FIG. 11).

If the steering momentum applied (35, see FIG. 1 to FIG. 3) leaves the nominal range—that is to say, if it is greater than approx. 10 Nm—, then the motor momentum (36) could not support the feedback momentum (37) that is produced by the primary gear (17) and the secondary gear (16), and it could thereby reverse the motor (5). In this case, the feedback momentum (37) is therefore greater than (>) the starting torque of the motor (36) (Case 3, see FIG. 13). This would have the result that the steering movement required is no longer transmitted to the steering gear (14). The steering momentum applied (35) can leave the nominal range, such as in the case of incorrect use, for example, such as during a test of a steering movement on the edge of a curb. What is referred to here as the so-called "diode function", which is advantageously constructionally integrated into the primary gear drive unit (24), prevents this reversal of the primary gear drive unit (14) upon overload—that is to say, if the feedback momentum (37) is greater than (>) the starting torque of the motor (36).

This so-called "diode function" will be described in the following (see FIG. 11 to FIG. 13).

The "diode function" is integrated within the primary gear drive unit (24) and is brought about by means of a momentum-controlled free-running acting on both sides.

The "diode function" is not activated in the nominal range. Here, the feedback momentum (37) is less than (<) the free-running activation momentum (38) and less than (<) the motor starting torque (36) (Case 1, compare FIG. 11)).

In this case, the motor starting torque (36) produced by the motor (5) is conveyed onto the coupling of the primary gear (30) by way of the main drive wheel (25) and the prestressed free-running spring (26). Because of the targeted prestressing of the free-running springs (26), no rotational relative movement takes place, below a defined free-running activation momentum (38), between the main drive wheel (25) and the coupling of the primary gear (30). The clamping bodies (28) are thereby pressed, by means of the clamping body spring (27), against the clamping incline (32) integrated into the coupling of the primary gear (30) and rotate jointly, without form closure, in a rotational manner with the clamping ring and the support ring (29), which are pressed against the secondary gear casing (33).

The diode function is activated above the nominal range. Here, the feedback momentum (37) is less than or equal to (<) the free-run activation momentum (38), and less than (<) the motor starting torque (36) (Case 2, see FIG. 12).

In this case, the motor starting torque (36) produced by the motor (5) exceeds the free-run activation momentum (38) and consequently activates the "diode function". A rotational relative movement (39) thereby comes about between the main drive wheel (25) and the coupling of the primary gear (30), as well as a form-locking placement (40). At the same time, the clamping body (28) is brought into engagement (41) between the clamping incline (32) and the clamping- and support ring (29) by means of the integrated clamping body spring (27). This means that the "diode function" is actively switched, and the drive motor (22) can drive the primary gear (17) up to its maximum possible motor starting torque (36).

The "diode function" is active in the overload range. In this range, the feedback momentum (37) is greater than (>) the free-running activation momentum (38), and greater than (>) the motor starting torque (36) (Case 3, see FIG. 13).

In this case, the feedback momentum (37) exceeds the motor starting torque (36) and the free-running activation momentum (38) produced by the motor (5). This case lies outside the nominal operating condition of the superimposition steering (2), and can be brought about by running into a curb, for example.

A reversal (42) of the drive motor (5) as the result of the feedback momentum (37) is now impeded by the clamping body (28) clamped between the coupling of the primary gear (30) and the clamping- and support ring (29). This means that the primary gear (17) is mechanically blocked on the secondary drive casing (33). Through the mechanical blocking of the primary drive (17), a control movement can now, in the event of an error, be conveyed onto the steering gear (12), outside the nominal steering range, without the activation of the locking unit (21).

The "diode function" integrated into the secondary gear (16) represents, by its mechanical behavior, a self-inhibiting gear, such as a worm gear drive, for example. The "diode function" integrated into the secondary gear (16), however, is, in contrast to a self-inhibiting gear, to be configured essentially free and independent of geometrical boundary conditions.

The electrically-activated locking unit (21) will be described in further detail in the following (see FIG. 12 to FIG. 16).

As has been described previously, the locking unit (21) rotating in parallel locks the pinion cage housing (19) upon the appearance of an error event (power failure, plausibility error) by means of a form-locking connection, such as a frontal dovetail (20), for example. An uncontrolled superimposition operation is consequently impeded mechanically. The steerability of the vehicle is maintained with the usual steering gear.

The locking unit (21) is preferably a premounted and inspected, as well as individually operable, structural component, and is axially mounted into the primary gear casing (43) in a form-locking and force-locking manner by means of the internal ring (44). A contacting (45) of an integrated activating magnet (46) to the internal or external strip conductor (dotted line 62 in FIG. 14) can take place during the mounting of the locking unit (21).

The normal function of the superimposition steering will be described in further detail in the following.

During the normal operation of the superimposition steering (21), the activating magnet (46) is flowed through by electrical power. An activation rod (47) of the activation magnet (46) hereby presses an activation ring (48), against spring resistance (50), onto a mechanical stopping unit (51). The spring resistance (50) is produced by a redundantly designed pressure spring (49). In this freely switched position, the clamping bodies (53), which are connected with the activating ring (48) in a form-locking manner and, by means of compression springs (52), in a force-locking manner as well, are pressed into the lower support points (54) of the clamping inclines (55) integrated into the internal ring (44). The external ring (57), which is frontally dovetailed, supported on the internal ring (44) by means of the support unit (56), and entrained by the pinion cage casing (19), can consequently rotate freely.

A non-active function or error function of the locking unit (21) is described in further detail in the following.

In the non-active or error function of the superimposition steering (1), the activating magnet (46) is without power—that is to say, it is not flowed through by electrical power. The spring resistance (50) produced by the compression spring (49) presses the force-free activation rod (47) of the activation magnet (46) and the activating ring (48) frontally against the thrust ring (58) connected with the external ring (57).

Both frontal sides (59) of the activating ring (48) and of the thrust ring (58) are toothed, through which a high activation momentum is transferred to the activating ring (48) upon the rotation of the pinion cage casing/external ring/thrust ring (19/57/58) through the increasing spring resistance (50).

Upon the rotation of the pinion cage casing/external ring/thrust ring (19/57/58) and the activation momentum brought about by the spring resistance (50), the activation ring (48), with the connected clamping bodies (53), is set into rotational movement and brings the clamping bodies (53) into a form-locking clamping position between the external ring (47) profiled on the internal side (60) and the clamping incline (55).

An uncontrolled rotation of the pinion cage housing (19) is impeded, and a blocking of the superimposition function is consequently achieved.

The separation of the drive- and the safety engineering concepts presented in the form of implementation described above is an essential feature of the superimposition gear (1) in accordance with the invention. A great freedom results from the separation in regard to the dynamic design and the optimization of the secondary gear (16) positioned in parallel as a drive for the pinion cage housing (18).

The invention claimed is:

1. A superimposition steering unit comprising:
a steering angle set by a driver can be superimposed by an additional angle;
one or more individually operable structural components, wherein the one or more individually operable structural components controls a superimposition function of the superimposition steering; a superimposition gear, which has at least one secondary gear module (16) and one primary gear module (17) as two individually operable structural components;
wherein the secondary gear module (16) has a drive motor (5), a frontal or belt drive (23), and a primary gear drive unit (24); and
wherein the primary gear drive unit (24) has a main drive wheel (25), a free-run spring (26), a clamping body spring (27), a clamping body (28), a clamping and support ring (29), a coupling of the primary gear (30), a secondary gear support (31), and clamping inclines (32).

2. The superimposition steering unit according to claim 1 further comprising:
a drive function module for providing a drive function; and
a safety function module for providing a safety function, wherein the safety function module is separate from the drive function module.

3. The superimposition steering unit according to claim 1, wherein the primary gear drive unit (24) has a momentum-controlled free-run unit acting on both sides, which free-run unit has means to ensure that, within a nominal range (25) of steering momentum, a required superimposition angle is conveyed, by means of the secondary gear module (16) and the primary gear module (17), onto a steering gear (14) of the superimposition steering and, in the event of an overload, if the steering momentum (35) applied leaves the nominal range, a reversal of the primary gear drive unit (24) is thereby impeded.

4. The superimposition steering unit according to claim 1, wherein the primary gear module (17) has a planetary gear unit (18) and a locking unit (21).

5. The superimposition steering unit according to claim 4, wherein an individually operable structural component is provided as a locking unit (21) in the primary gear module and the primary gear module can lock the superimposition gear (1) in the event of an error.

6. The superimposition steering unit according to claim 4, wherein an individually operable structural component is provided as a locking unit (21) in a primary gear casing and the primary gear casing can lock the superimposition gear (1) in the event of an error.

7. The superimposition steering unit according to claim 4, wherein the superimposition steering unit has a planetary gear as a superimposition gear, and the locking unit (21) can be activated electrically and, upon the appearance of an error event, locks a pinion cage housing (19) by means of a form-locking connection.

8. The superimposition steering unit according to claim 1, wherein the superimposition steering unit is integrated into a hydraulic or electrohydraulic power-assisted steering unit by mounting in a divided steering column.

9. A superimposition steering unit comprising:
a steering angle set by a driver that can be superimposed by an additional angle;
one or more individually operable structural components, wherein the one or more individually operable structural components controls a superimposition function of the superimposition steering;
a superimposition gear, which has at least one secondary gear module (16) and one primary gear module (17) as two individually operable structural components;
wherein the secondary gear module (16) has a drive motor (5), a frontal- or belt drive (23), and a primary gear drive unit (24);
wherein the primary gear drive unit (24) has a momentum-controlled free-run unit acting on both sides, which free-run unit has means to ensure that, within a nominal range (25) of steering momentum, a required superimposition angle is conveyed, by means of the secondary gear module (16) and the primary gear module (17), onto a steering gear (14) of the superimposition steering and, in the event of an overload, if the steering momentum (35) applied leaves the nominal range, a reversal of the primary gear drive unit (24) is thereby impeded;
wherein the primary gear module (17) has a planetary gear unit (18) and a locking unit (21); and
wherein an individually operable structural component is provided as a locking unit (21) in a primary gear casing and the primary gear casing can lock the superimposition gear (1) in the event of an error.

10. The superimposition steering unit according to claim 9 further comprising:
a drive function module for providing a drive function; and
a safety function module for providing a safety function, wherein the safety function module is separate from the drive function module.

11. The superimposition steering unit according to claim 9, wherein the primary gear drive unit (24) has a main drive wheel (25), a free-run spring (26), a clamping body spring (27), a clamping body (28), a clamping- and support ring (29), a coupling of the primary gear (30), a secondary gear support (31), and clamping inclines (32).

12. The superimposition steering unit according to claim 9, wherein an individually operable structural component is provided as a locking unit (21) in the primary gear module and the primary gear module can lock the superimposition gear (1) in the event of an error.

13. The superimposition steering unit according to claim 9, wherein the superimposition steering unit has a planetary gear as a superimposition gear, and the locking unit (21) can be activated electrically and, upon the appearance of an error event, locks a pinion cage housing (19) by means of a form-locking connection.

14. The superimposition steering unit according to claim 9, wherein the superimposition steering unit is integrated into a hydraulic or electro-hydraulic powerassisted steering unit by mounting in a divided steering column.

15. A superimposition steering unit comprising:
 a steering angle set by a driver that can be superimposed by an additional angle;
 one or more individually operable structural components, wherein the one or more individually operable structural components controls a superimposition function of the superimposition steering;
 a superimposition gear, which has at least one secondary gear module (16) and one primary gear module (17) as two individually operable structural components;
 wherein the secondary gear module (16) has a drive motor (5), a frontal- or belt drive (23), and a primary gear drive unit (24);
 wherein the primary gear module (17) has a planetary gear unit (18) and a locking unit (21); and
 an individually operable structural component provided as a locking unit (21) in a primary gear casing and the primary gear casing can lock the superimposition gear (1) in the event of an error.

* * * * *